US008999159B2

(12) United States Patent
McKenzie

(10) Patent No.: US 8,999,159 B2
(45) Date of Patent: Apr. 7, 2015

(54) REMOVAL OF MAGNETIC PARTICLES FROM A FLUID

(75) Inventor: Martin Stewart McKenzie, Aberdeenshire (GB)

(73) Assignee: Romar International Limited (GB)

(*) Notice: Subject to any disclaimer, the term of this patent is extended or adjusted under 35 U.S.C. 154(b) by 0 days.

(21) Appl. No.: 13/456,595

(22) Filed: Apr. 26, 2012

(65) Prior Publication Data

US 2013/0026087 A1  Jan. 31, 2013

Related U.S. Application Data

(63) Continuation of application No. 11/990,870, filed as application No. PCT/GB2006/003148 on Aug. 22, 2006, now abandoned.

(30) Foreign Application Priority Data

Aug. 24, 2005  (GB) .................................... 0517252.3
Jul. 21, 2006  (GB) .................................... 0614493.5

(51) Int. Cl.
| | | |
|---|---|---|
| *B01D 35/06* | (2006.01) | |
| *B03C 1/20* | (2006.01) | |
| *B03C 1/28* | (2006.01) | |

(52) U.S. Cl.
CPC ............... *B03C 1/20* (2013.01); *B03C 2201/20* (2013.01); *B01D 35/06* (2013.01); *B03C 2201/18* (2013.01); *B03C 1/286* (2013.01)

(58) Field of Classification Search
CPC .......... B03C 1/284; B03C 1/286; B03C 1/30; B03C 1/32; B03C 1/28; B03C 1/16; B03C 1/18; B03C 1/12; B03C 1/20; B03C 1/029; B03C 2201/18; B03C 2201/20; B03C 2201/22; C02F 1/481; C02F 1/488; C02F 2201/48; B01D 35/06
USPC ........ 209/12.1, 218, 213–217, 221, 225, 226, 209/223.2, 39, 904; 198/370.13, 377.05, 198/377.09, 468.5, 679, 690.1; 210/222, 210/223, 695, 396, 400
See application file for complete search history.

(56) References Cited

U.S. PATENT DOCUMENTS 2,642,994 A * 6/1953 Casson ......................... 210/222
2,693,979 A   11/1954 Russell
(Continued)

FOREIGN PATENT DOCUMENTS

DE    19726745 A1   1/1999
FR     2848128 A1   6/2004
(Continued)

OTHER PUBLICATIONS

Excerpt from Examination Report dated Dec. 18, 2012 from European Patent Application No. 06765337.8 (2 pages).

*Primary Examiner* — David C Mellon
(74) *Attorney, Agent, or Firm* — Workman Nydegger

(57) ABSTRACT

An apparatus for removing magnetic particles from a mud slurry is disclosed, and includes one or more endless belts or chains enclosed almost wholly within a pipe. A motor drives the chain around the pipe. When the pipe is located within a mud slurry, magnetic particles in the mud slurry are drawn to the pipe and carried along the outside and away from the slurry until a collar is reached. Once separated the particles can be collected for disposal. The chain comprises a series of units linked together. Each unit includes a magnet with pole pieces at either pole to direct magnetic flux. Wear discs prevent the magnets and pole pieces from abrasion as they are drawn through the pipe. Units can be included in the chain which units do not include a magnet, thereby providing a break in the field, allowing particles to fall away from the collar region.

30 Claims, 11 Drawing Sheets

(56) References Cited

U.S. PATENT DOCUMENTS

| | | | |
|---|---|---|---|
| 2,759,606 A * | 8/1956 | Nippert | 210/222 |
| 2,813,628 A * | 11/1957 | Klaus | 209/218 |
| 3,124,527 A * | 3/1964 | Watanabe et al. | 209/218 |
| 3,357,559 A * | 12/1967 | Israelson | 209/218 |
| 3,476,232 A * | 11/1969 | Merwin et al. | 198/619 |
| 3,487,939 A * | 1/1970 | Keeley | 210/222 |
| 3,508,663 A * | 4/1970 | Brill | 210/396 |
| 3,834,542 A | 9/1974 | Linstruth | |
| 4,043,215 A * | 8/1977 | Long et al. | 474/218 |
| 5,170,891 A | 12/1992 | Barrett | |
| 6,086,761 A * | 7/2000 | Green | 210/222 |
| 6,355,176 B1 * | 3/2002 | Schaaf et al. | 210/695 |

FOREIGN PATENT DOCUMENTS

| | | | |
|---|---|---|---|
| GB | 1203307 | | 8/1970 |
| JP | 55111303 A | * | 8/1980 |
| WO | 2007001729 A2 | | 1/2007 |

* cited by examiner

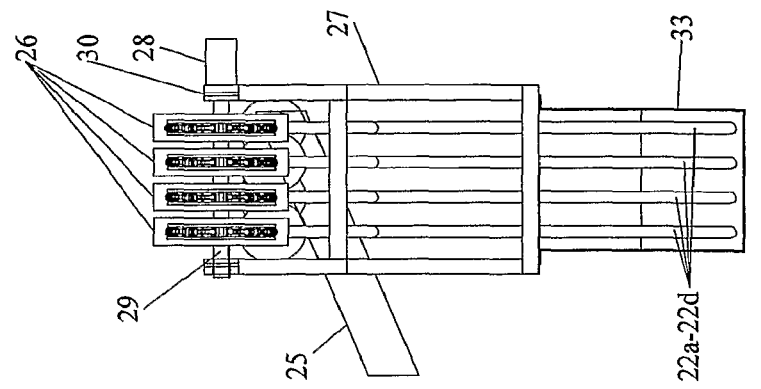
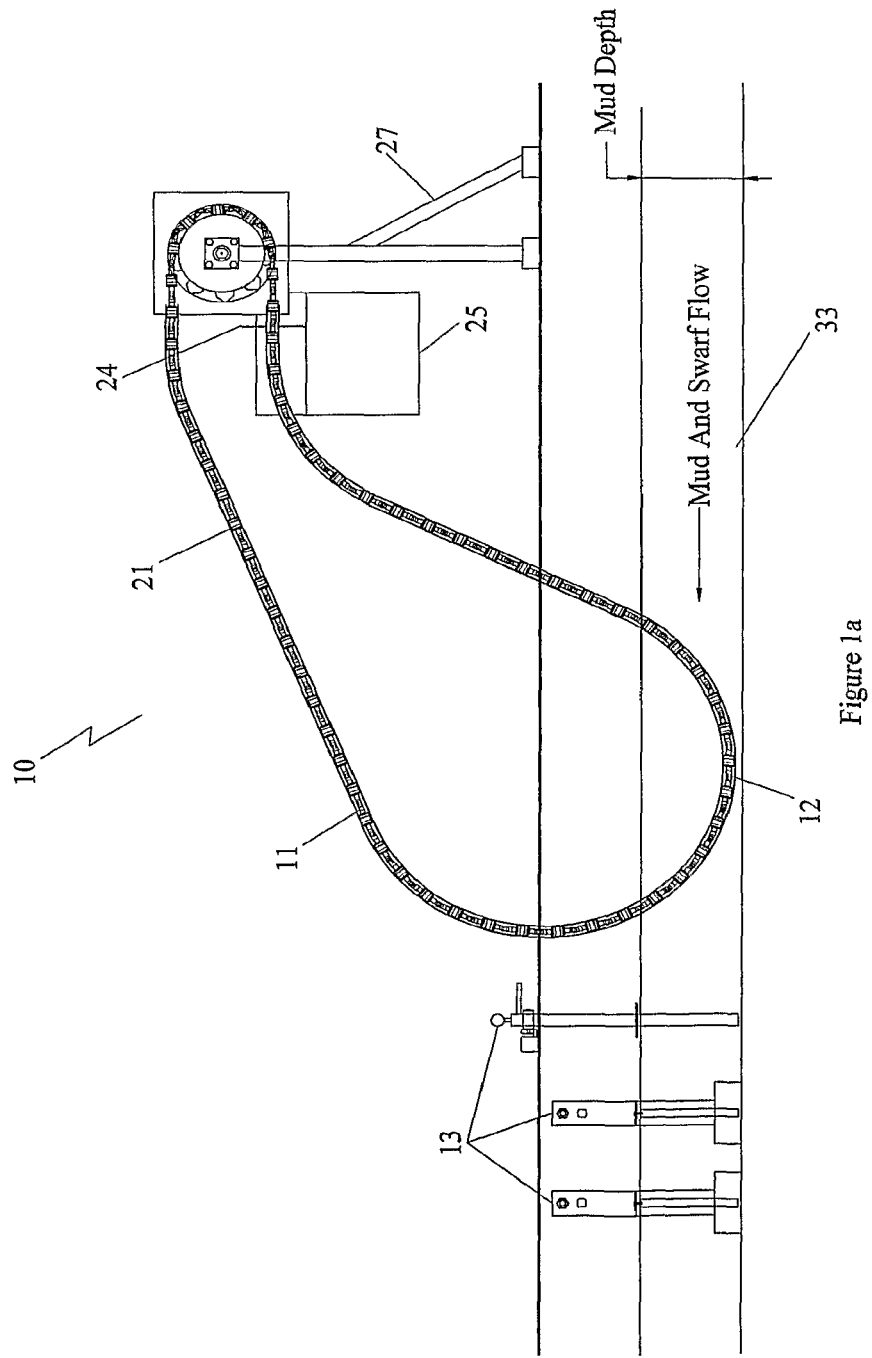
Figure 1b
Figure 1a

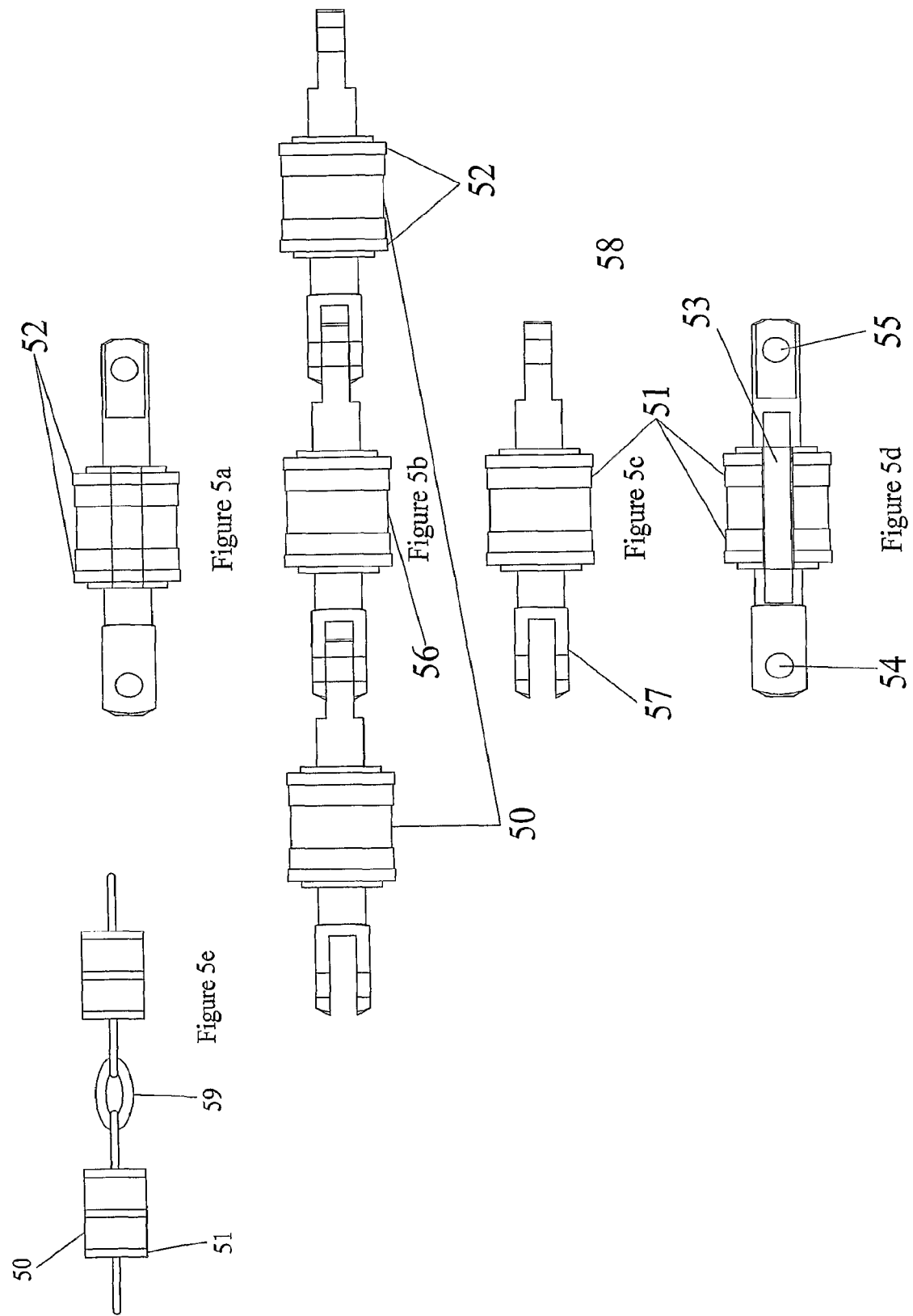

REMOVAL OF MAGNETIC PARTICLES FROM A FLUID

CROSS-REFERENCE TO RELATED APPLICATIONS

This application is a continuation of U.S. application Ser. No. 11/990,870, filed Mar. 20, 2009, entitled "REMOVAL OF MAGNETIC PARTICLES FROM A FLUID", now abandoned, which is a National Stage Application of International Application No. PCT/GB2006/003148 filed Aug. 22, 2006, which claims the benefit of United Kingdom Patent Application No. 0517252.3, filed Aug. 24, 2005 and United Kingdom Patent Application No. 0614493.5, filed Jul. 21, 2006, all of which are incorporated herein by reference.

BACKGROUND OF THE INVENTION

1. The Field of the Invention

The present invention relates to apparatus for removing magnetic particles from a fluid. The apparatus finds particular application in the oil and gas industry in relation to separating iron-containing swarf from free-flowing or viscous liquid mud.

2. The Relevant Technology

Oil and gas wells usually have their bore holes lined with steel pipes, referred to normally as casing. In mature wells, when oil or gas production drops below economic production levels, it is often useful to utilise at least part of said bore hole. In order to be able to do this one alternative is to remove the casing completely. However, it is more cost effective to simply drill the pipeline out, or at least to drill a window in the pipeline. The window can then be used to allow a drilling assembly to exit the bore hole and reach a new part of the reservoir.

Such a method obviously produces large quantities of steel swarf derived primarily from the pipeline. The swarf is mixed during the drilling process with large quantities of mud either from the bore hole or from its introduction as a lubricant. Typically the mud/swarf mixture will comprise a sufficient quantity of water to enable the mixture to flow. Due to the high steel content of the mud when it exits the bore hole and its potential hazard, in part due to the sharpness of the metal slithers it contains, disposal or re-use of the mud can be problematic. One method of decontamination is simply to remove excess water from the mixture and then separate the larger swarf pieces by hand. This is obviously a time consuming and potentially dangerous mode of separation.

It is an object of the present invention to provide an improved apparatus to separate the solid magnetic or magnatisable particles from a fluid system and in particular, apparatus which can be applied in the oil and gas industry.

BRIEF SUMMARY OF THE INVENTION

According to a first aspect of the invention there is provided an apparatus for removing magnetic particles from a liquid or slurry; the apparatus comprising;
(a) an endless belt or chain, including along its length, a plurality of magnetic field generation units to attract magnetic particles;
(b) an enclosing means preventing contact of magnetic particles with the magnetic field generators;
(c) drive means to circulate the endless belt within the enclosing means;
(d) collection means to collect the particles.

The apparatus provides a simple and efficient method to separate the magnetic particles from the slurry allowing the magnetic particles to be disposed of more easily or to be reused.

Preferably, one or more magnetic field generation units comprises one or more permanent magnets, which do not therefore require an electricity supply to function. The units further preferably comprise one or more pole pieces to direct the magnetic field of the magnets. Optionally the units include one or more wear discs to reduce wear on the magnets or pole pieces. Advantageously, the or each magnet includes a hole along its axis to enable linkage means to be attached to the unit.

Preferably the endless belt or chain consists of a plurality of units linked together. Particularly preferably the chain includes one or more units not including a magnet. The gap in the magnetic field resulting in the lack of magnet allows swarf to be more easily removed from the apparatus.

The apparatus preferably includes one or more enclosing means arranged in an array each enclosing means associated with an endless belt. By combining a plurality of enclosing means a larger flow of mud can be subjected to swarf removal.

The relative positions of enclosing means can optionally be adjusted, thereby allowing channels of different shapes to be used to allow mud flow. Advantageously, the or each enclosing means is mounted to mounting means. Further advantageously, the enclosing means is formed of steel.

According to a second aspect of the invention there is provided a device for removing magnetic particles from a liquid or slurry, the device comprising;
(a) an elongate magnetic field generator;
(b) a casing separating the generator from a liquid or slurry;
(c) the magnetic field passing through the casing causing magnetic particles to be attracted to the device and be retained on the casing;
(d) means for removing the attracted particles from the field generated by the generator, enabling the particles to be removed from the device.

Preferably, the device comprises a helical cleaning means, rotatable about the axis of the magnetic field generator, the inner surface of the cleaning means engaging the casing and rotation of the cleaning means moving the attracted particles from the field generated by the generator.

Alternatively, the device preferably includes a cleaning barrier, engaging the casing around the generator, the barrier being moveable between a first and second position, the motion pushing the particles out of the field generated by the generator. The particulars can thereby easily be removed from the device.

Advantageously, the magnetic generator comprises a stack of magnets alternating polarity along the length of the generator.

Optionally, the magnetic poles are orientated along the length of the axis of the field generator. The magnetic field generated levels to push away from the device which is of assistance when moving particles. Alternatively, the poles are orientated perpendicularly to the axis of the field generator. The magnetic field assists motion of the particles along the axis of the device.

According to a third aspect of the invention there is provided an array for removing magnetic particles from a liquid or slurry, the device comprising;
(a) one or more magnets, said the or each magnet being housed within a casing;

(b) the housing being attached to a framework, which framework being locatable on a fluid-carrying channel, and such that the or each casing is at least partially immersed in the fluid.

BRIEF DESCRIPTION OF THE DRAWINGS

The invention will now be described with respect to the accompanying drawings which show by way of example only, embodiments of swarf removing apparatus. In the drawings;

FIG. 1a is a side view of a first embodiment of swarf removing apparatus;

FIG. 1b is an end view of the first apparatus shown in FIG. 1a;

FIGS. 5a to 5e are diagrams of magnetic elements and means of joining the elements together;

DETAILED DESCRIPTION OF THE PREFERRED EMBODIMENTS

Figures 2A, 2B:
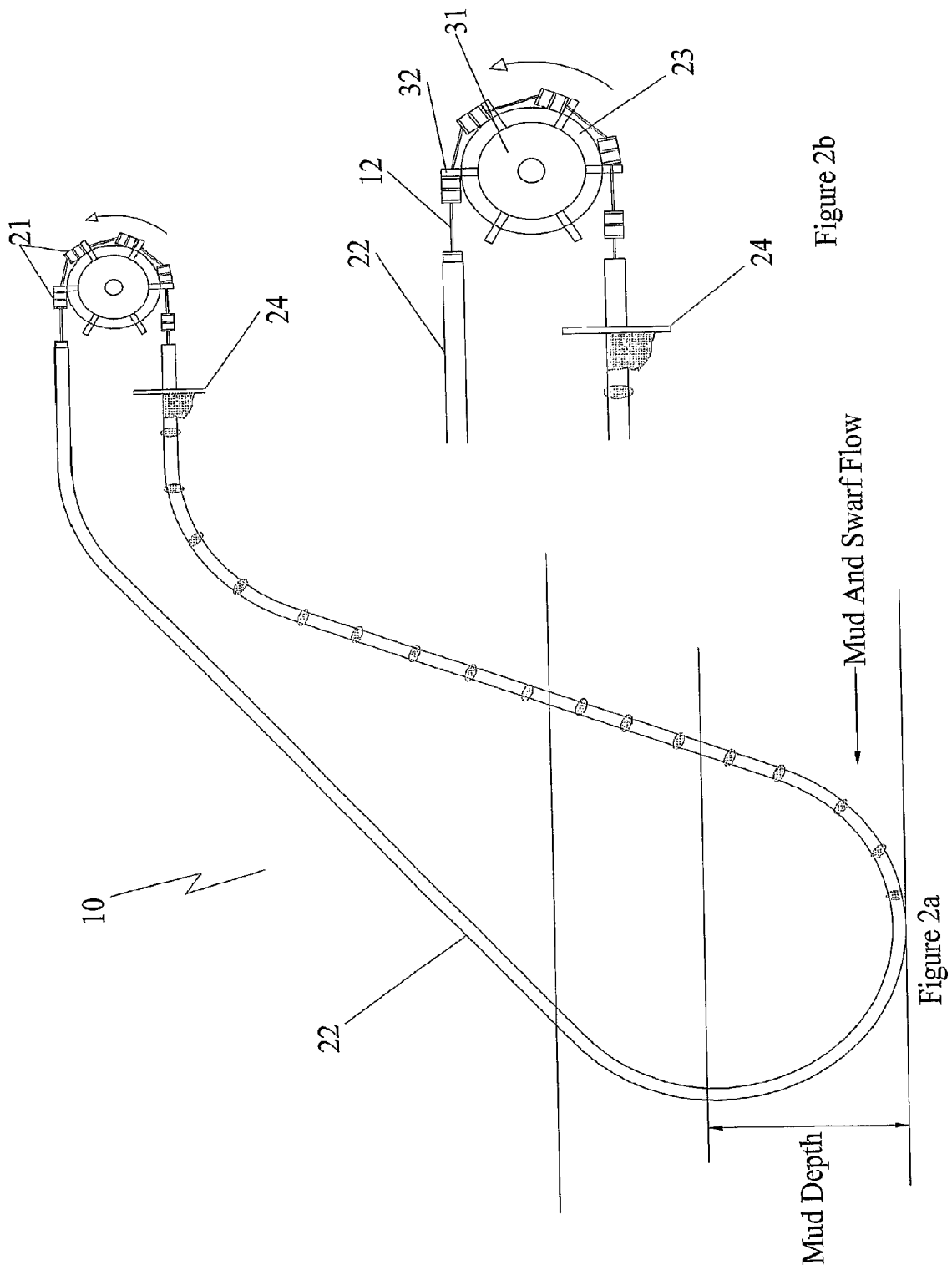
FIG. 2 is an illustrative side view of the embodiment of FIGS. 1a and 1b.

Referring initially to FIGS. 1 and 2, these show an overview of an apparatus combining two embodiments of the invention for use as a swarf remover, removing swarf from a mud slurry. In FIG. 1, swarf is to be removed from mud flowing from right to left across the figure. The apparatus shown comprises two distinct sections which act together to remove the maximum percentage of swarf.

In the first section, the mud is passed around a series of steel pipes 11 of an apparatus 10 through which pipes 11 an endless chain of magnets, moving in the opposite direction to the flow of the mud, is circulated. In the second section, the mud passes a series of static magnets 13 the magnets 13 remove any swarf not caught in the first section.

FIG. 2 is a schematic representation of the apparatus 10, showing a series of magnets 21, linked together into an endless chain drawn through a steel pipe 22a. Motive force for the movement of the magnets 21 is provided by the rotating driver 23. Swarf attracted towards the magnets 21 is held against the outside of the steel pipe 22a and drawn with the magnets 21 along the pipe 22a. Eventually, the swarf is prevented from moving further along the pipe 22a by a collar 24 located across the pipe 22a. As the magnets 21 continue through the pipe therefore, the magnetic force holding the swarf against the pipe 22a is removed and the swarf drops into a collection chute 25.

The apparatus 10 is shown in more detail in FIG. 1 and comprises a series of magnets 21 linked together to form a chain 12. The chain 12 is drawn through the pipe 22a by a drive means 26 mounted to a support frame 27. Motive force to the drive means 26 is provided by a motor 28, driving a shaft 29—mounted on bearings 30—onto which a drive gear 31 is mounted. The drive gear 31 comprises a series of paddles or projections 32 to engage the chain 12 of magnets conveying the chain 12 through the pipe 22a.

In FIG. 1b, an apparatus is shown having four magnetic chains and pipes 22a-d mounted alongside each other to enable the width of the channel 33 carrying the mud to be subjected to the magnetic fields generated. The whole volume of the mud is therefore subject to magnetic fields to remove the metal swarf. As can be seen from FIG. 1b, the drive gears associated with the chains are mounted about a common shaft. Moreover, the swarf collected from each pipe is collected into the common chute 25.

Figure 4B:
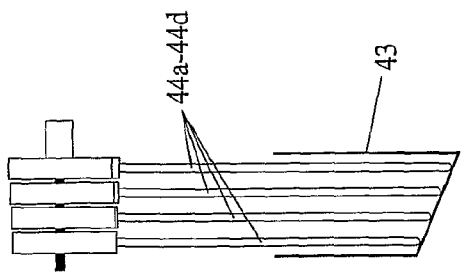
FIGS. 4a, 4b are side views illustrative of a second configuration of the embodiment of FIG. 1.
Figure 4A:
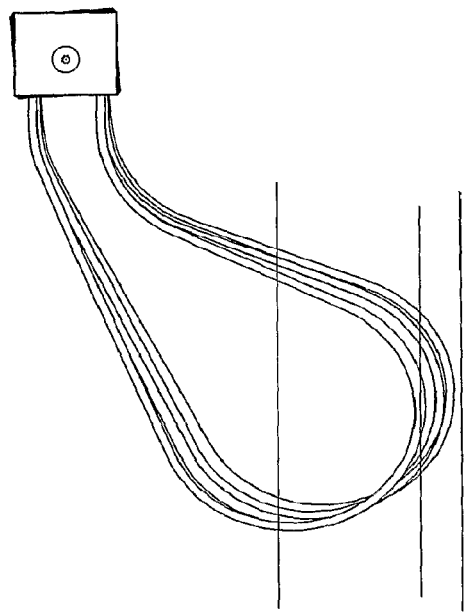
Figure 3B:
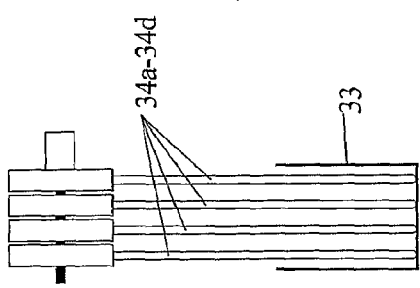
FIGS. 3a, 3b are side views illustrative of a first configuration of the embodiment of FIG. 1.
Figure 3A:
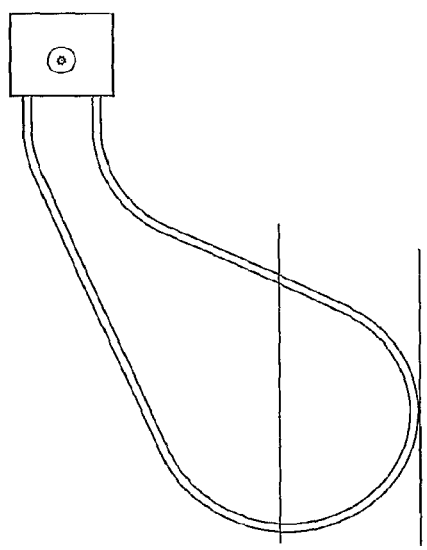

The above arrangement allows the apparatus to be used in mud channels of differing cross-sectional shape. This is illustrated in FIGS. 3 and 4. In FIGS. 3a, 3b the channel is of rectangular cross-section and the steel pipes 34a to d are lined up with one another much that the lowest point of each pipe 34a to d is at substantially the same distance from the channel 33 as its neighbour. In FIGS. 4a, 4b the channel 43 is deeper on one side. By tilting the drive means associated with certain of the pipes 44a to d, the pipes can be lowered further into the channel so that swarf does not slip underneath the pipe. The side view of the pipes in FIG. 4a shows the non-overlapping configuration of the pipes.

It will be obvious to the skilled man, that through this means, channels of different cross-sectional shape to the above exemplified can be dealt with by the apparatus.

Turning to the magnetic chain, this is shown in more detail in FIGS. 5a to d. The basic unit for the chain is shown in FIGS. 5a to c and comprises a magnet with means for linking this to neighbouring magnets.

The basic magnetic unit comprises a substantially cylindrical magnetic element or magnet 50 formed of a transition metal magnet having a cylindrical hole along its axis. Pole pieces 51a, 51b are affixed to the end of the magnet 50. The pole pieces 51a, 51b are formed of soft iron and act to direct magnetic flux out of the pipe to facilitate attraction of swarf in the mud flow. Wear discs 52a, 52b which are resistant to wear are secured to each pole piece 51a, 51b. As can be seen from the Figures, the diameter of the wear discs 52a, 52b greater than that of the magnet 50 and the pole pieces 51 to ensure that the wear discs 52a, 52b wear away sacrificially. The elements 50, 51 and 52 can be quickly removed and replaced with a similar unit when necessary.

In order to enable the magnets to be secured to one another, the unit is provided at a first end with a female clevis 57 and at a second end with a corresponding male clevis 58. To ensure that the basic unit remains together, a stud 53 is fixed across the assembly passing through the holes in the magnet 50, pole pieces 51a, 51b and wear discs 52a, 52b. A screw or bolt is passed through the holes 54, 55 in each clevis 57, 58 and through the stud 53.

In order to link adjacent magnets therefore, the clevis of each neighbouring magnetic unit is aligned, with opposite poles adjacent to each other, and secured to one another, allowing the units to pivot relative to one another. Sufficient units are linked together eventually to form an endless chain which passes through and is enclosed almost completely, by the steel pipe.

In use it has been found that care needs to be taken to provide breaks in the magnetic field, to allow the swarf to be released from the pipe, to enable the outside of the pipe 22 around the region of the collar 24 to be kept free of swarf. One solution to this problem is to replace the magnet in alternate links with a dummy, non-magnetic element 56. As the chain moves through the pipe therefore, the region around the collar 24 is periodically subject to magnetic fields which are not strong enough to retain the swarf, allowing the swarf to drop into the collection chute 25. It will be apparent that the weakening of the field can be achieved in a number of ways. For example, in similar fashion to the embodiment described above, every third, fourth etc magnet can be excluded. Alternatively or additionally, the distance between magnets can be increased.

Although it has been found advantageous to include gaps in the field it is not essential, and the amount of swarf in the collar region can be allowed to build up until its own weight causes a proportion of the mass built up to fall into the chute.

FIG. 5e shows an alternative, more flexible linkage means 59 between adjacent magnets, allowing curvature of the chain in two places.

Figure 6B:
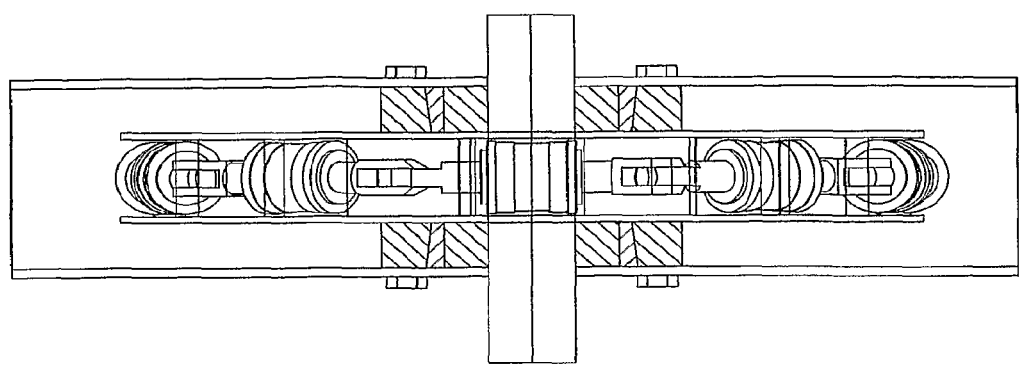
FIGS. 6a, 6b are detailed side and end views of drive means for use in the apparatus.
Figure 6A:
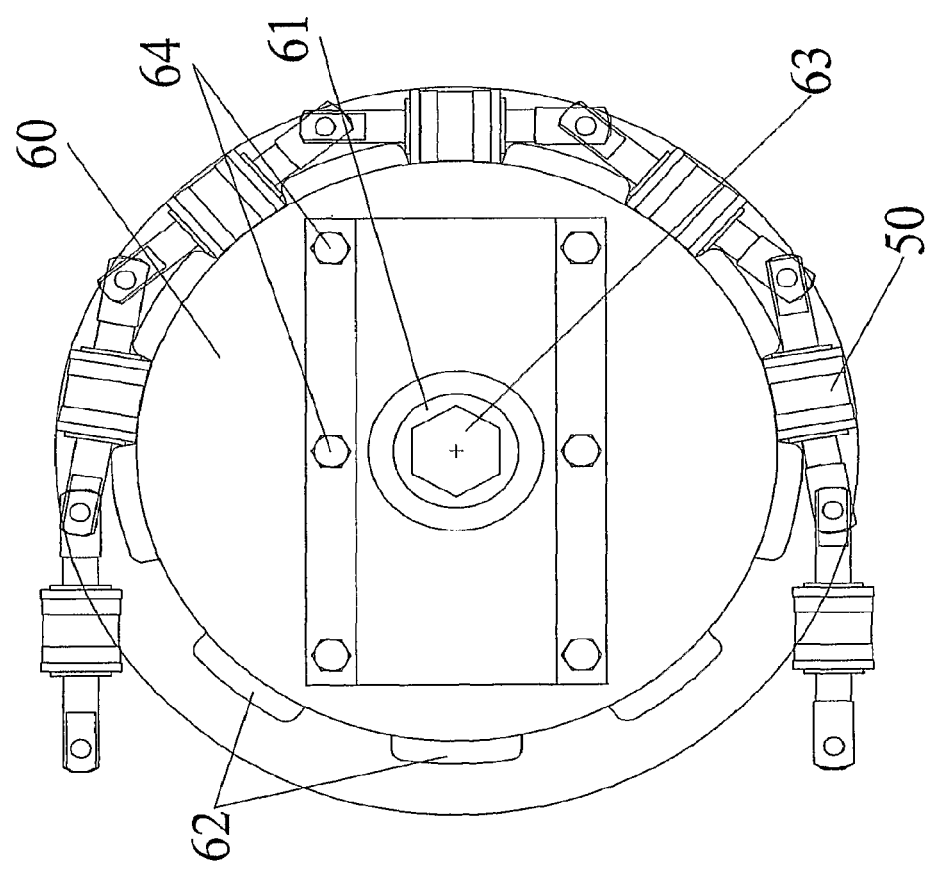

A drive mechanism for the chain including the magnet units of FIGS. 5a to 5d is shown in FIGS. 6a, 6b which illustrate a drive head assembly. A drive wheel 60 is mounted to a rotatable shaft 61. The magnet is held between the teeth 62 of the drive wheel 60 and as the wheel 60 rotates therefore, the endless chain of magnets is drawn around the pipe 22. Loosening of the nut 63 allows the assembly to be rotated about the shaft 61 in order to change the orientation of the steel pipe 22 in the manner described above. Once the pipe 22 is in the required orientation, the nut 63 can be tightened. Tensioning of the chain of magnets can be achieved through the use of tensioning adjuster 64. This effectively moves the drive gear to make the overall length of the path followed by the chain longer or shorter.

In use therefore, the supporting frame is located above the channel through which the mud contained in the swarf is to flow. The drive mechanism and the steel pipes through which the magnetic chains are drawn, are located on the support frame such that the base of the steel pipes guiding the chain are close to the bottom of the channel and spaced apart sufficient that the space between the pipes is small enough for the entire width of the mud in the channel to be subjected to a magnetic field. If necessary, a pipe can be tilted to enable the pipe layout to conform to the shape of the channel. Moreover, the pipes are aligned such that the movement of the chain within the pipe is opposed to the flow of the mud in the section of pipe below the mud surface.

The drive meal's is then activated, circulating the magnetic chain within the pipe. The mud is allowed to flow within the channel. As the mud flows past the pipes, metal swarf is attracted to the pipe and, due to the chain circulation, is carried out of the mud along the outside of the pipe until it engages the collar 24. As a magnetic element 50 of the chain together with the swarf particles attracted by that element 50 circulates beyond the collar 24, the magnetic field retaining the swarf particles drops and the swarf particles fall from the pipe into a collection chute. Using the above apparatus, and a typical swarf-containing mud, approximately 800-1000 gallons of mud have been processed at a rate of yield of 1 ton/hour of swarf.

Figure 7:
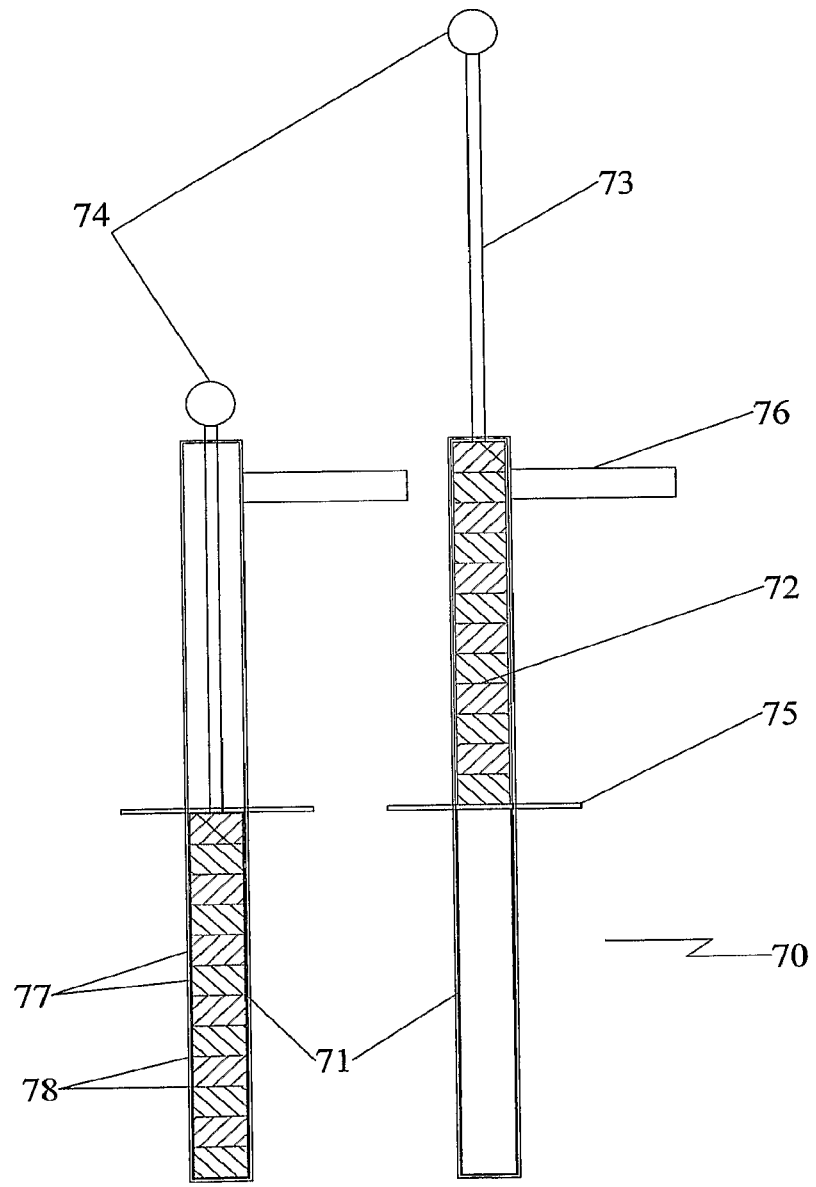
FIG. 7 shows two configurations of the second embodiment of swarf removing apparatus.
Figure 8B:
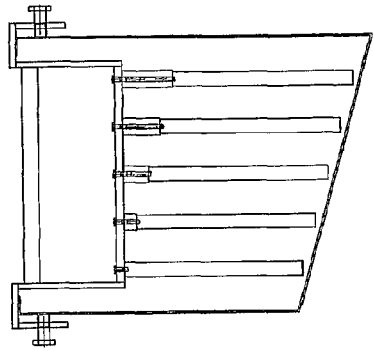
FIGS. 8a to 8d show in use configurations of the apparatus of FIG. 7.
Figure 8D:
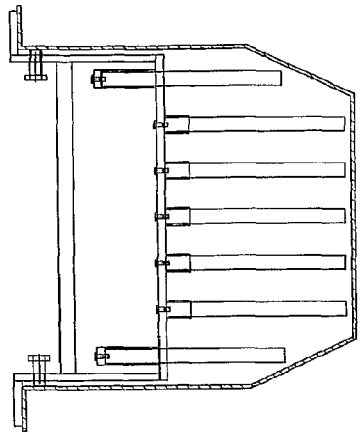
Figure 8A:
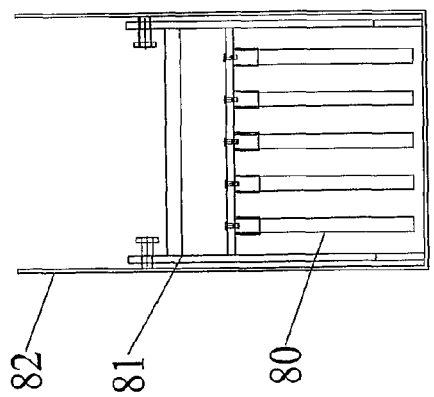
Figure 8C:
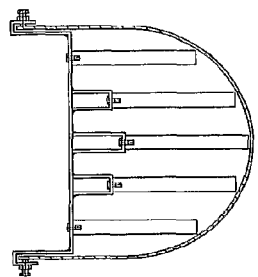

The second section of the apparatus shown in FIG. 1 is shown in FIG. 7. In FIG. 7, a rod 70 comprises an outer tubular steel case 71 closed at its in use lower end to prevent penetration of water into the tubular case 71. Slideably mounted within the case 71, a cylindrical magnet 72 is capable of moving from a lower in use position (left-hand view) to a raised cleaning position (right-hand view). The magnet 72 comprises alternatively rare-earth type magnets 77 and soft iron pole pieces 78, again to force lines of flux outside the case 71. In this section, the magnets 77 are orientated in N-N, S-S relationship with neighbouring magnets. As can be seen from FIG. 7, the height of the magnet is approximately half that of the case 71. A shaft-rod 73 is mounted at its first end to the upper end of the magnet 72 and passes through the upper, open end of the case 71. A seal is maintained at the open end to prevent water ingress. The second end of the shaft 73 comprises a handle 74 to operate the rod 70.

The rod 70 further includes a swarf stop 75 in the form of an annulus mounted about the outside of the case 71 and at the height of the top of the magnet 72, when the magnet 72 is in its lower position. A support 76 enables the rod 70 to be held in position in the channel by a suitable frame.

In use therefore, the rod or series of rods 70 is positioned in the channel. The magnet 72 is lowered within the case 71 by operation of the swarf-rod 73. The flow of mud within the channel is commenced and as the mud flows around the rod 70, swarf in the mud is attracted to the case 71 and held there by the magnet 72. When sufficient swarf has been collected, the rod 70 is lifted out of the mud stream. The handle 74 is used to pull the magnet 72 from one end of the case 71 to the other. As this occurs, the accumulated swarf is pulled along the case until it reaches the stop 75. Eventually, as all of the magnet 72 is withdrawn above the level of the stop 75, the swarf drops off, preferably into a suitable collection vessel.

FIGS. 8a to 8d show an alternative embodiment comprising a series of rods 80, secured to a framework 81. The rods 80 comprise an outer casing, formed of steel. The casing houses a series of magnets, fixed in position, and separated by pole pieces as described above. The magnets can be orientated, with respect to a neighbouring magnet in an N-S, N-N or S-S configuration. The framework 89 is designed specifically for the channel 82 in which the mud flows, and is such that the rods 80 follow the contours of the channel 82. In use, once the rods 80 have accumulated sufficient swarf, the framework 81 is lifted out of the channel 82 and the swarf removed, usually by hand. The framework 81 can then be replaced in the channel.

Figure 9:
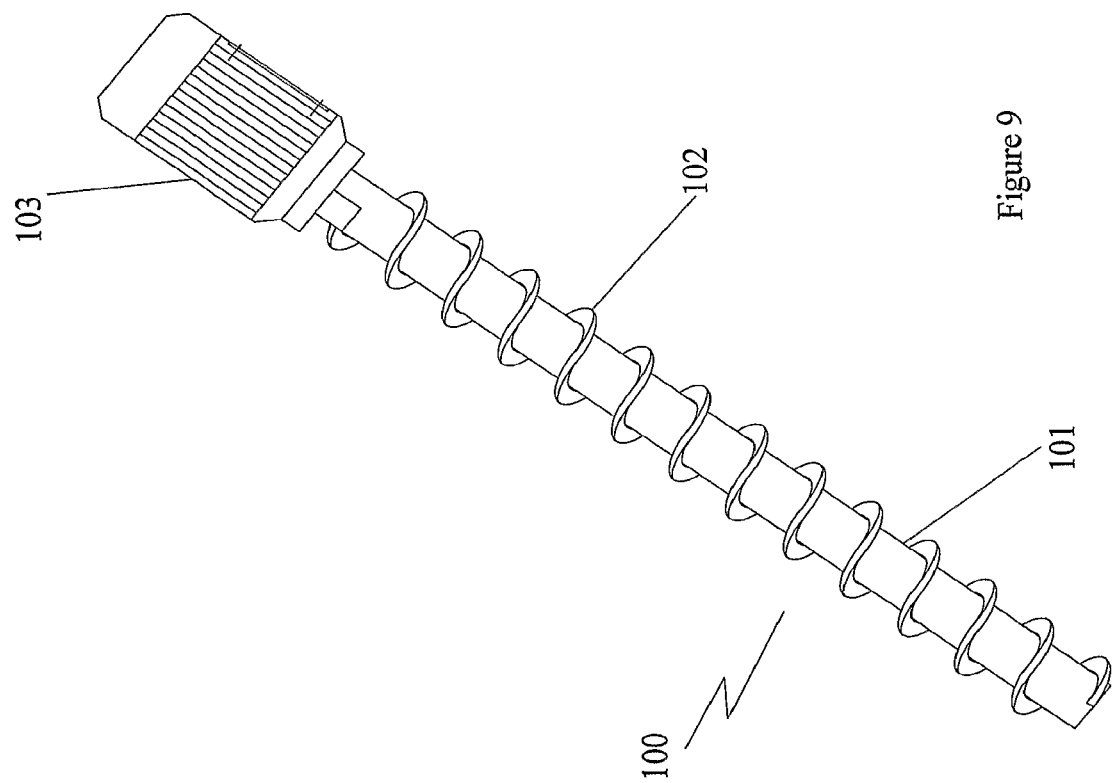
FIG. 9 shows a further example of the second embodiment of swarf removing apparatus.

A further embodiment of the rods shown in FIG. 7 is shown in FIG. 9. The rod 100 is designed to be self cleaning which again minimises operator time which needs to be devoted to maintenance. The rod 100 comprises a central shaft 101 which contains a series of magnets assembled together in the same fashion as those in the embodiment of FIG. 7. The rod 100 further comprises a helix 102 wound about the shaft 101: the inner surface of the helix 102 being in contiguous relationship with the surface of the shaft 101. The helix 102 is rotatably mounted and its motion about the shaft 101 is driven by the motor 103 which drives the helix 102 in the direction indicated; the helix therefore functions in the same fashion as a conventional auger.

As will be envisaged therefore any swarf attracted to the magnets in the shaft 101 will be pushed by the helix 102 up the shaft 101 towards the motor 103. Eventually as the swarf reaches the upper half of the shaft 101, the magnetic attraction exerted by the magnets in the shaft 101 on the swarf reduces eventually until the force is insufficient to retain the swarf and it falls from the rod 100. The rod 100 is orientated at around 45° to the horizontal to ensure that when the swarf is released from the rod it does not fall back down the rod 100, but instead falls into a collection element (not illustrated).

Figure 10:
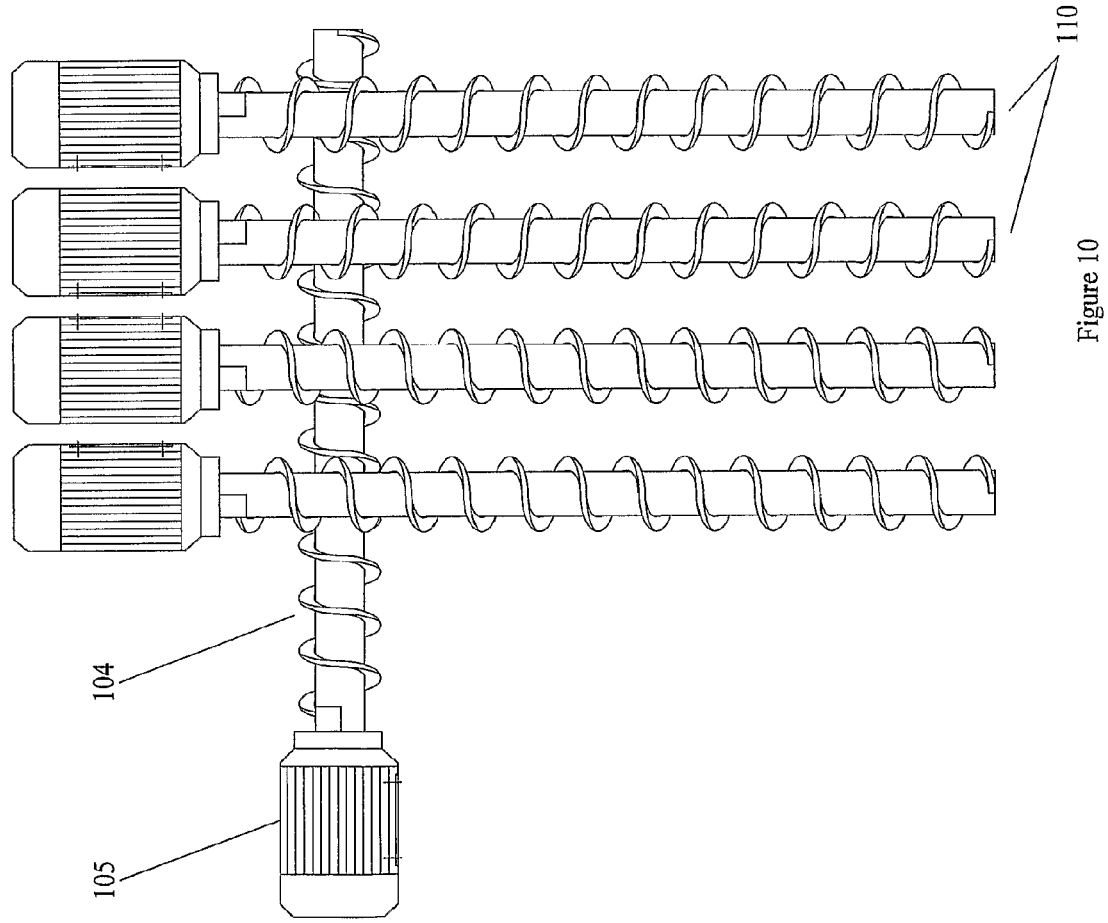
FIG. 10 shows an array of swarf removing apparatus according to the second embodiment.

In FIG. 10, an array of rods 110 shown in FIG. 9 is shown. The array comprises four rods 110 (which are according to the rod 100 described above) mounted together and deployed in a vertical orientation in a channel (not illustrated) through which mud from which swarf is to be removed is flowing. The array has a further rod 104 which is also of the same type as 100, which is orientated horizontally. The rod 104 is so positioned that the magnetic elements of the rod 110 are sufficiently close to the non-magnetic regions of the vertically orientated rods 100 to remove any swarf from these regions of the vertically orientated rods 100.

In use therefore, swarf removed from the mud flow by the rods 110 is conveyed by the helices 102 up the shaft 101 of the rod 110. The swarf is eventually conveyed into the non-magnetic region of the rods 110. Here the swarf is attracted to the magnetic region of the rod 104. From here, the swarf is conveyed along the rod 104 by the helix 102 in the direction of the motor 105. Swarf is conveyed to the nonmagnetic region of the rod 104 from which it falls under gravity and can be collected in a suitable container.

Figure 11:
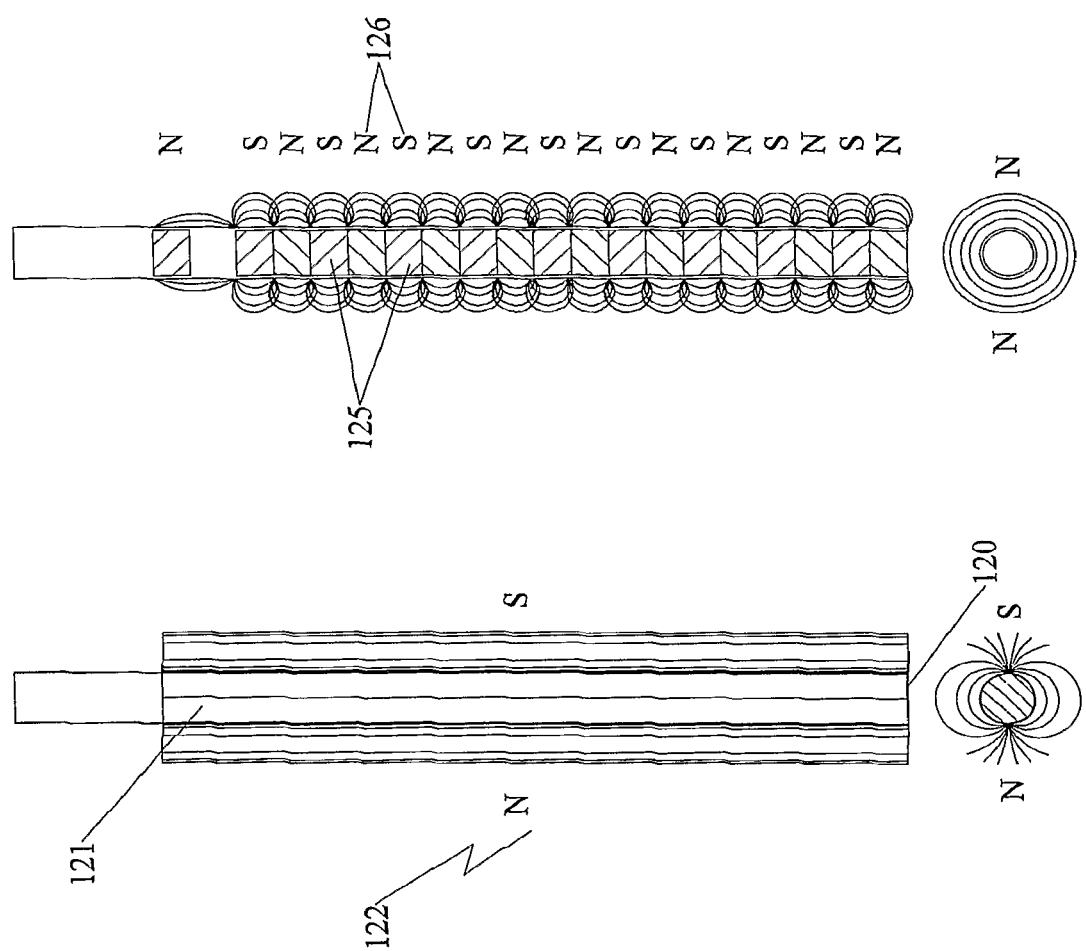
FIGS. 11A, 11B show two orientations for magnets within the second embodiment.

FIGS. 11A, 11B describe two orientations for magnets contained within rods. In FIG. 11A, the magnet 120 has a north pole running along one side of the length of an Internal core 121 of the rod 122. As can be seen from the sectional drawing of this rod, the resultant magnetic flux extends away from the rod and is symmetric across the plane running from the north pole to the south pole. In the arrangement shown in FIG. 11B, the magnets 125 are arranged in a stacked fashion giving a series of alternate poles 126. As can be seen from the section taken through the stack of magnets shown under the main drawing of the rod. In this particular arrangement the magnetic flux assists in movement of swarf along the rod, as flux lines connect adjacent magnets.

In a further embodiment of the invention, as shown in FIG. 1a, the two above embodiments can be used cooperatively with one another. In this embodiment, apparatus including an endless chain described above is used upstream of the rods, the rods being used effectively to collect the swarf missed by the chain apparatus.

Figure 12:
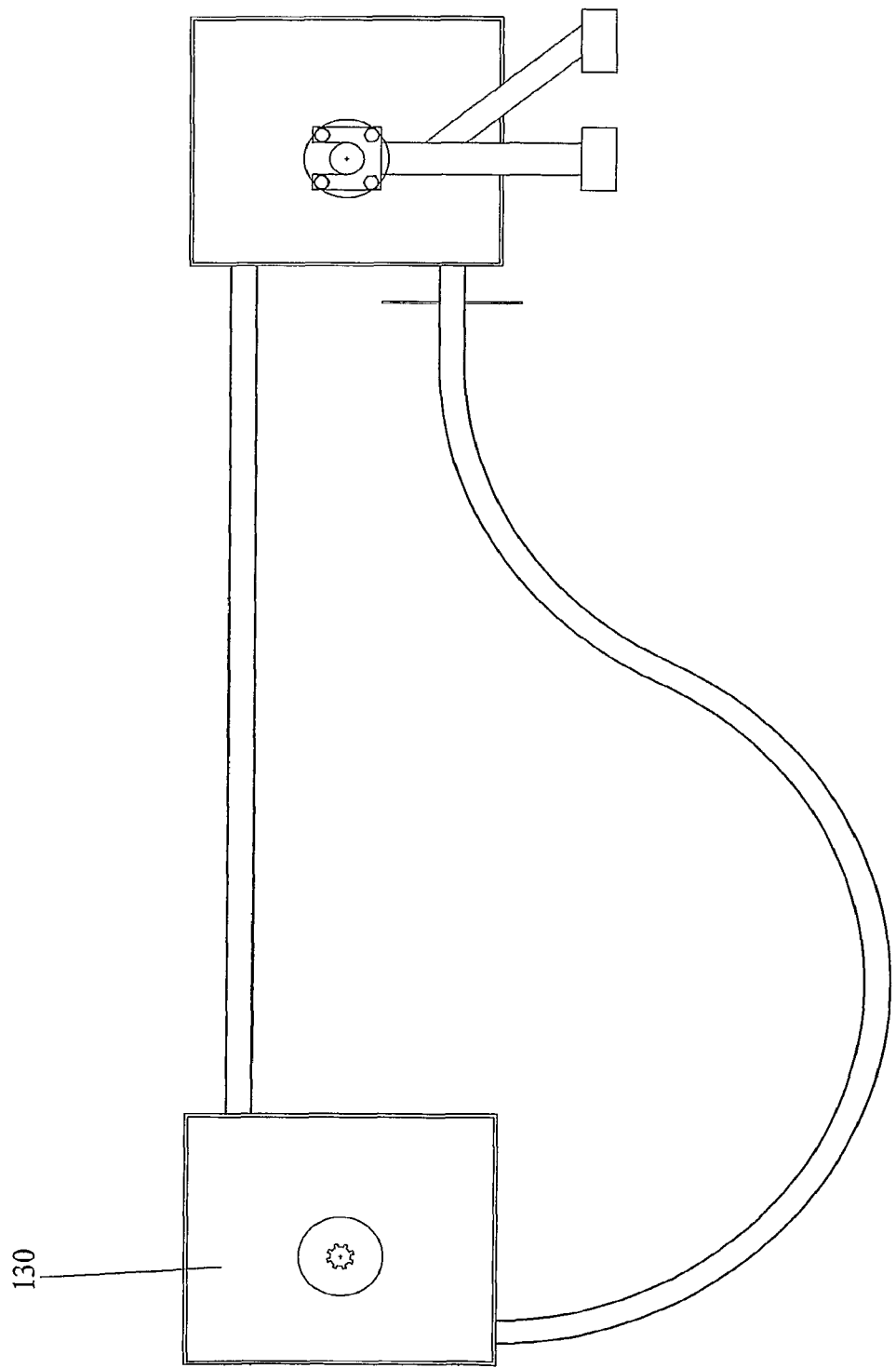
FIG. 12 shows further apparatus for use in the embodiment of FIG. 1.

FIG. 12 shows a further embodiment of an apparatus including an endless chain, the apparatus being designed particularly for use where space for the chain to turn is limited and the path described by the chain includes regions of high curvature. In addition to the features described above, the apparatus includes a gearing mechanism 130 to assist the motor (FIGS. 1, 28) to circulate the chain and to ensure that the tension within the chain remains suitable.

In an alternative embodiment, not illustrated, the swarf can be removed from the steel pipe by a brush means. Such a brush means is particularly suited for use where the magnetic field generated by the magnetic chain is fairly continuous, and at least sufficient to hold the swarf against the pipe in the region of the collar.

It will be appreciated that the embodiment of FIGS. 7-11 employing the static magnets and the embodiment incorporating the moving magnets can be used independently of one another. In some situations the more portable static magnet arrangement is more easily deployed and serviced, whereas in other the moving magnet arrangement will be more suitable.

It will of course be understood that the invention is not limited to the specific details described herein, which are given by way of example only, and that various modifications and alterations are possible with the scope of the appended claims.

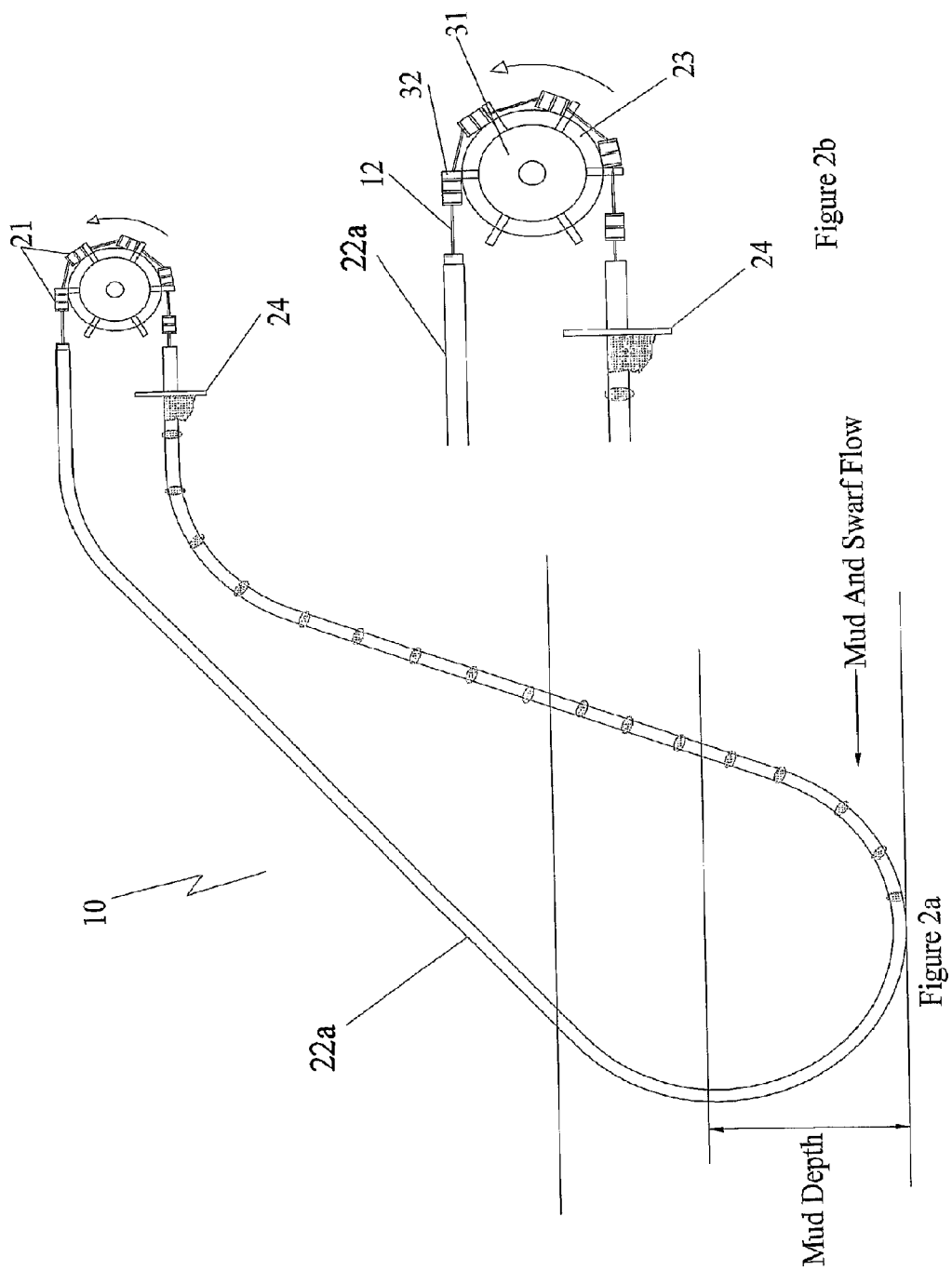

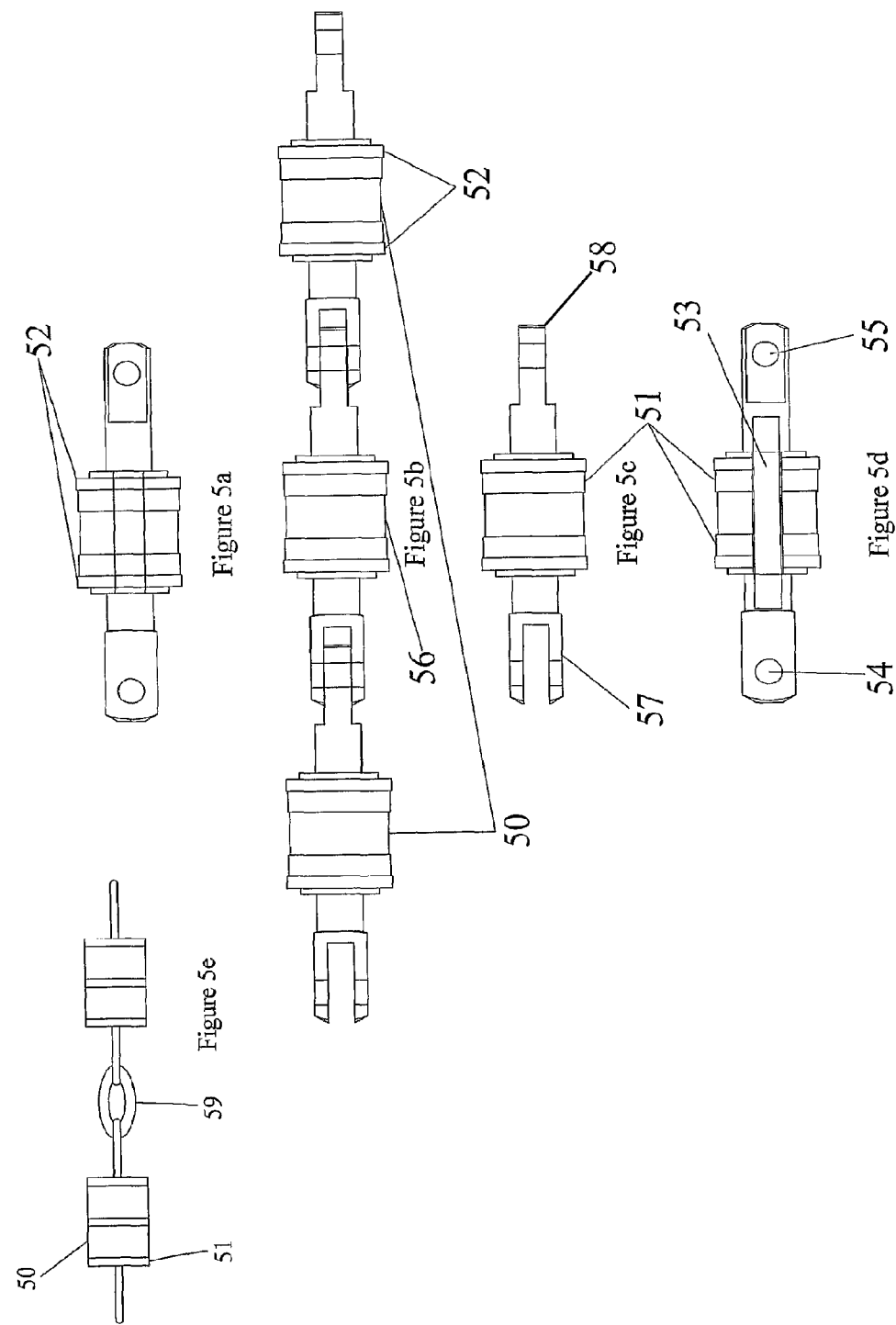

What is claimed is:

1. An apparatus for removing magnetic particles from liquid or slurry, said apparatus comprising:
    a support frame;
    a plurality of endless chains, each endless chain including along a length of the endless chain a plurality of magnetic field generation units to attract magnetic particles;
    a plurality of pipes arranged in an array and connected to the support frame along a width of the support frame, each pipe providing an enclosing means associated with and surrounding a single one of the plurality of endless chains, for preventing contact of magnetic particles with said plurality of magnetic field generation units;
    drive means to circulate each of the plurality of endless chains within a respective pipe of the plurality of pipes; and
    collection means to collect the magnetic particles,
    wherein the drive means is configured to circulate each endless chain to pass through a bore defined by its associated pipe by drawing the endless chain along the pipe, and wherein the bore of a pipe defines a path followed by its associated endless chain;
    wherein each plurality of magnetic field generation units is configured to direct a magnetic flux out of its associated pipe around the entirety of an outside surface of the pipe to attract magnetic particles to the outside surface of the pipe;
    wherein each endless chain draws the magnetic particles along the outside surface of its associated pipe to the collection means; and
    wherein each endless chain comprises, from the plurality of magnetic field generation units, a group of adjacent magnetic field generation units linked together, and comprises at least one non-magnetic unit positioned between two magnetic field generation units in the endless chain.

2. An apparatus according to claim 1, wherein said plurality of magnetic field generation units each comprise at least one permanent magnet.

3. An apparatus according to claim 2, wherein said plurality of magnetic field generation units each comprise at least one pole piece to direct a magnetic field of said at least one permanent magnet.

4. An apparatus according to claim 2, wherein said at least one permanent magnet includes a hole along its axis.

5. An apparatus according to claim 1, wherein each of said plurality of magnetic field generation units includes at least one wear disc to reduce wear on a magnet or a pole piece.

6. An apparatus according to claim 5, wherein the each of the plurality of magnetic field generation units includes a pair of wear discs, a first wear disc of the pair of wear discs being positioned at a first end of the magnetic field generation unit and a second wear disc of the pair of wear discs being positioned at a second end of the magnetic field generation unit, and wherein each wear disc has a diameter greater than a diameter of a permanent magnet of the magnetic field generation unit.

7. An apparatus according to claim 1, wherein said plurality of pipes are positionally adjustable relative to one another.

8. An apparatus according to claim 1, wherein each enclosing means is mounted to mounting means.

9. An apparatus according to claim 1, wherein each enclosing means is formed of steel.

10. An apparatus according to claim 1, wherein each of the magnetic field generation units comprises a substantially cylindrical magnetic element.

11. An apparatus according to claim 10, wherein the substantially cylindrical magnetic elements of each of the endless chains are axially located in the respective pipe of each endless chain.

12. An apparatus according to claim 1, configured to be disposed in a channel comprising a flowing liquid or slurry.

13. An apparatus according to claim 1, wherein the array is spaced to enable fluid to pass between adjacent pipes, and is arranged to enable a width of a volume in which the apparatus is located to be subjected to magnetic fields generated by the plurality of magnetic field generation units.

14. An apparatus according to claim 1, wherein a position of at least one of the pipes is adjustable to change a depth at which the pipe passes through the liquid or slurry.

15. An apparatus according to claim 1, wherein the apparatus is configured to be disposed in a channel comprising a flowing liquid or slurry and a position of each of the plurality of pipes is adjustable to orient the plurality of pipes to fit an irregular cross section of the channel.

16. A system for removing magnetic particles from a flowing fluid, the system comprising:
   an apparatus as claimed in claim 1, and
   a device, separated from the apparatus in a flow direction, the device comprising an elongate magnetic field generator; a casing separating said generator from the liquid or slurry;
   wherein the magnetic field generated by the elongate magnetic field generator passes through the casing of the device, causing magnetic particles in the liquid or slurry to be attracted to said device and be retained on said casing; and
   wherein the device further comprises means for removing the attracted particles from the field generated by said elongate magnetic field generator, enabling the particles to be removed from said device.

17. An apparatus according to claim 1, further comprising a tensioning adjuster for adjusting the tension in at least one of the plurality of endless chains.

18. An apparatus for removing magnetic particles from a fluid-carrying channel of a flowing fluid, the apparatus comprising:
   a support frame;
   a plurality of endless chains, each endless chain including along a length of the endless chain a plurality of magnetic field generation units to attract magnetic particles;
   a plurality of pipes connected to the support frame along a width of the support frame, each pipe providing an enclosing means associated with and surrounding a single one of the plurality of endless chains for preventing contact of magnetic particles with the magnetic field generation units;
   a drive means to circulate each of the plurality of endless chains within a respective pipe;
   and a collection means to collect the magnetic particles;
   wherein the plurality of enclosing means are arranged in an array configured to be located on a fluid-carrying channel;
   wherein the drive means is configured to circulate each of the plurality of endless chains to pass through a bore defined by each endless chain's associated pipe by drawing the endless chain along the pipe, and wherein the bore of a pipe defines a path followed by its associated endless chain;
   wherein each of the plurality of magnetic field generation units is configured to direct magnetic flux out of its associated pipe all around an outside surface of the pipe to attract magnetic particles to the outside surface of the pipe;
   wherein each of the plurality of endless chains draws the magnetic particles along the outside surface of its associated pipe to the collection means;
   wherein the array is spaced to enable fluid to pass between adjacent pipes, and is arranged to enable the width of the channel to be subjected to magnetic fields generated by the plurality of magnetic field generation units; and
   wherein each endless chain comprises, from the plurality of magnetic field generation units, a group of adjacent magnetic field generation units linked together, and comprises at least one non-magnetic unit positioned between two magnetic field generation units in the endless chain.

19. An apparatus according to claim 18, wherein each of the plurality of pipes is adjustably connected to the support frame such that a position of each of the plurality of pipes is selectively adjustable relative to the support frame and the other pipes of the plurality of pipes.

20. An apparatus according to claim 18, wherein a position of at least one of the plurality of enclosing means is adjustable to change a depth to which the at least one enclosing means extends into the fluid in the channel.

21. An apparatus according to claim 18, wherein a position of each of the plurality of enclosing means is adjustable to orient the plurality of enclosing means to fit an irregular cross section of the channel.

22. An apparatus according to claim 18, wherein the plurality of magnetic field generation units comprise substantially cylindrical magnetic elements.

23. An apparatus according to claim 18, further comprising a tensioning adjuster for adjusting the tension in at least one of the plurality of endless chains.

24. An apparatus according to claim 18, wherein the each of the plurality of magnetic field generation units includes a pair of wear discs, a first wear disc of the pair of wear discs being positioned at a first end of the magnetic field generation unit and a second wear disc of the pair of wear discs being positioned at a second end of the magnetic field generation unit, and wherein each wear disc has a diameter greater than a diameter of a permanent magnet of the magnetic field generation unit.

25. An apparatus for removing magnetic particles from liquid or slurry;
   said apparatus comprising:
   a support frame;
   a plurality of endless chains, each endless chain including along a length of the endless chain a plurality of magnetic field generation units to attract magnetic particles;
   a plurality of pipes arranged in an array and connected to the support frame along a width of the support frame, each pipe providing an enclosing means associated with and surrounding a single one of the plurality of endless chains, for preventing contact of magnetic particles with said plurality of magnetic field generation units;
   drive means to circulate each of the plurality of endless chains within a respective enclosing means; and
   collection means to collect the magnetic particles;
   wherein the drive means is configured to circulate each endless chain to pass through a bore defined by its associated pipe by drawing the endless chain along the pipe, and wherein each of the pipes follows a curved path;
   wherein each plurality of magnetic field generation units is configured to direct magnetic flux out of its associated pipe all around the surface of the pipe to attract magnetic particles to the outside of the pipe;
   wherein each endless chain draws the magnetic particles along the outside of its associated pipe to the collection means;

wherein each of the plurality of magnetic field generation units includes a pair of wear discs, a first wear disc of the pair of wear discs being positioned at a first end of the magnetic field generation unit and a second wear disc of the pair of wear discs being positioned at a second end of the magnetic field generation unit, and wherein each wear disc has a diameter greater than a diameter of a permanent magnet of the magnetic field generation unit; and wherein the wear discs of the magnetic field generation units of each endless chain contact an inner wall of the bore of a respective pipe, such that the bore of the pipe defines a path followed by its associated endless chain, and guides the associated endless chain around the pipe.

26. An apparatus according to claim 25 wherein each endless chain comprises a plurality of adjacent magnetic field generation units linked together, and comprises at least one non-magnetic unit positioned between two magnetic field generation units in the endless chain.

27. An apparatus according to claim 25 wherein the drive means comprises a drive wheel associated with each pipe, and wherein each drive wheel comprises teeth which engage the wear discs of the magnetic field generation units of the endless chain associated with the pipe to draw the endless chain around the pipe.

28. An apparatus for removing magnetic particles from liquid or slurry;
said apparatus comprising:
a support frame;
a plurality of endless chains, each endless chain including along a length of the endless chain a plurality of magnetic field generation units to attract magnetic particles;
a plurality of pipes arranged in an array and connected to the support frame along a width of the support frame, each pipe providing an enclosing means associated with and surrounding a single one of the plurality of endless chains, for preventing contact of magnetic particles with said plurality of magnetic field generation units;
drive means to circulate each of the plurality of endless chains within a respective enclosing means; and
collection means to collect the magnetic particles;
wherein the drive means is configured to circulate each endless chain to pass through a bore defined by its associated pipe by drawing the endless chain along the pipe, and wherein each of the pipes follows a curved path;
wherein each plurality of magnetic field generation units is configured to direct magnetic flux out of its associated pipe all around the surface of the pipe to attract magnetic particles to the outside of the pipe;
wherein each endless chain draws the magnetic particles along the outside of its associated pipe to the collection means;
wherein each of the plurality of magnetic field generation units includes a pair of wear discs, a first wear disc of the pair of wear discs being positioned at a first end of the magnetic field generation unit and a second wear disc of the pair of wear discs being positioned at a second end of the magnetic field generation unit;
wherein the drive means comprises a drive wheel associated with each pipe, and wherein each drive wheel comprises teeth which engage the wear discs of the magnetic field generation units of the endless chain associated with the pipe to draw the endless chain around the pipe.

29. An apparatus according to claim 28 wherein each wear disc has a diameter greater than a diameter of a permanent magnet of the magnetic field generation unit; and
wherein the wear discs of the magnetic field generation units of each endless chain contact an inner wall of the bore of a respective pipe, such that the bore of the pipe defines a path followed by its associated endless chain and guides the associated endless chain around the pipe.

30. An apparatus according to claim 28 wherein each endless chain comprises a plurality of adjacent magnetic field generation units linked together, and comprises at least one non-magnetic unit positioned between two magnetic field generation units in the endless chain.

* * * * *

UNITED STATES PATENT AND TRADEMARK OFFICE
CERTIFICATE OF CORRECTION

| | | |
|---|---|---|
| PATENT NO. | : 8,999,159 B2 | |
| APPLICATION NO. | : 13/456595 | |
| DATED | : April 7, 2015 | |
| INVENTOR(S) | : McKenzie | |

It is certified that error appears in the above-identified patent and that said Letters Patent is hereby corrected as shown below:

In the Drawings

Delete Drawing Sheets 2 of 11 and 4 of 11 and substitute therefore with the attached Drawing Sheets 2 of 11 and 4 of 11

In the Specification

Column 1
Line 45, change "slithers" to --slivers--

Column 5
Line 48, change "drive meal's" to --drive mechanism--

Column 6
Line 34, change "framework 89" to --framework 81--

Column 7
Line 4, change "rod 110" to --rod 104--
Line 10, change "rod 110" to --rods 110--
Line 42, change "FIGS. 1, 28" to --FIG. 1, 28--

Signed and Sealed this
Fifth Day of April, 2016

Michelle K. Lee
*Director of the United States Patent and Trademark Office*